United States Patent
Hsieh et al.

(10) Patent No.: US 8,246,179 B2
(45) Date of Patent: Aug. 21, 2012

(54) PROJECTOR WITH LENS HEIGHT ADJUSTING FUNCTION

(75) Inventors: Ming-Chih Hsieh, Taipei Hsien (TW); Tsung-Hsi Li, Taipei Hsien (TW); Yau-Leung Chan, Santa Clara (CA)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 334 days.

(21) Appl. No.: 12/730,240

(22) Filed: Mar. 24, 2010

(65) Prior Publication Data

US 2011/0222027 A1  Sep. 15, 2011

(30) Foreign Application Priority Data

Mar. 9, 2010  (TW) ............................. 99106696 A

(51) Int. Cl.
*G03B 21/14* (2006.01)
*G03B 21/00* (2006.01)

(52) U.S. Cl. ............. 353/101; 353/69; 353/70; 353/100
(58) Field of Classification Search .................. 353/69, 353/70, 100, 101; 476/67; 359/809, 811, 359/813, 814; 248/188.8
See application file for complete search history.

(56) References Cited

U.S. PATENT DOCUMENTS

| | | | |
|---|---|---|---|
| 5,599,083 A * | 2/1997 | Mort | 353/69 |
| 2006/0209272 A1* | 9/2006 | Ishino | 353/119 |
| 2011/0235002 A1* | 9/2011 | Hsieh et al. | 353/101 |

* cited by examiner

*Primary Examiner* — Georgia Y Epps
*Assistant Examiner* — Danell L Owens
(74) *Attorney, Agent, or Firm* — Altis Law Group, Inc.

(57) ABSTRACT

A projector includes a projector body, a lens module with a lens, and a gear module. The lens module and the gear module are arranged in the projector body. The gear module is operable to adjust a height of the lens and keep an angle of the lens, in response to the gear module being rotated.

4 Claims, 7 Drawing Sheets

PROJECTOR WITH LENS HEIGHT ADJUSTING FUNCTION

BACKGROUND

1. Technical Field

The present invention relates to projectors, and particularly, to a projector which can adjust the height of a lens of the projector conveniently.

2. Description of Related Art

Projectors are used very widely in a lot of places, such as offices, homes, etc. Some times, users need to heighten up a height of a lens of a projector to make a height of the projecting image from the lens match a projected screen. However, when the height of the lens is heightened up to a certain angle, the image on the projected screen may be distorted because the angle of the lens is changed correspondingly, which may influence projected images.

DETAILED DESCRIPTION

Figure 1:
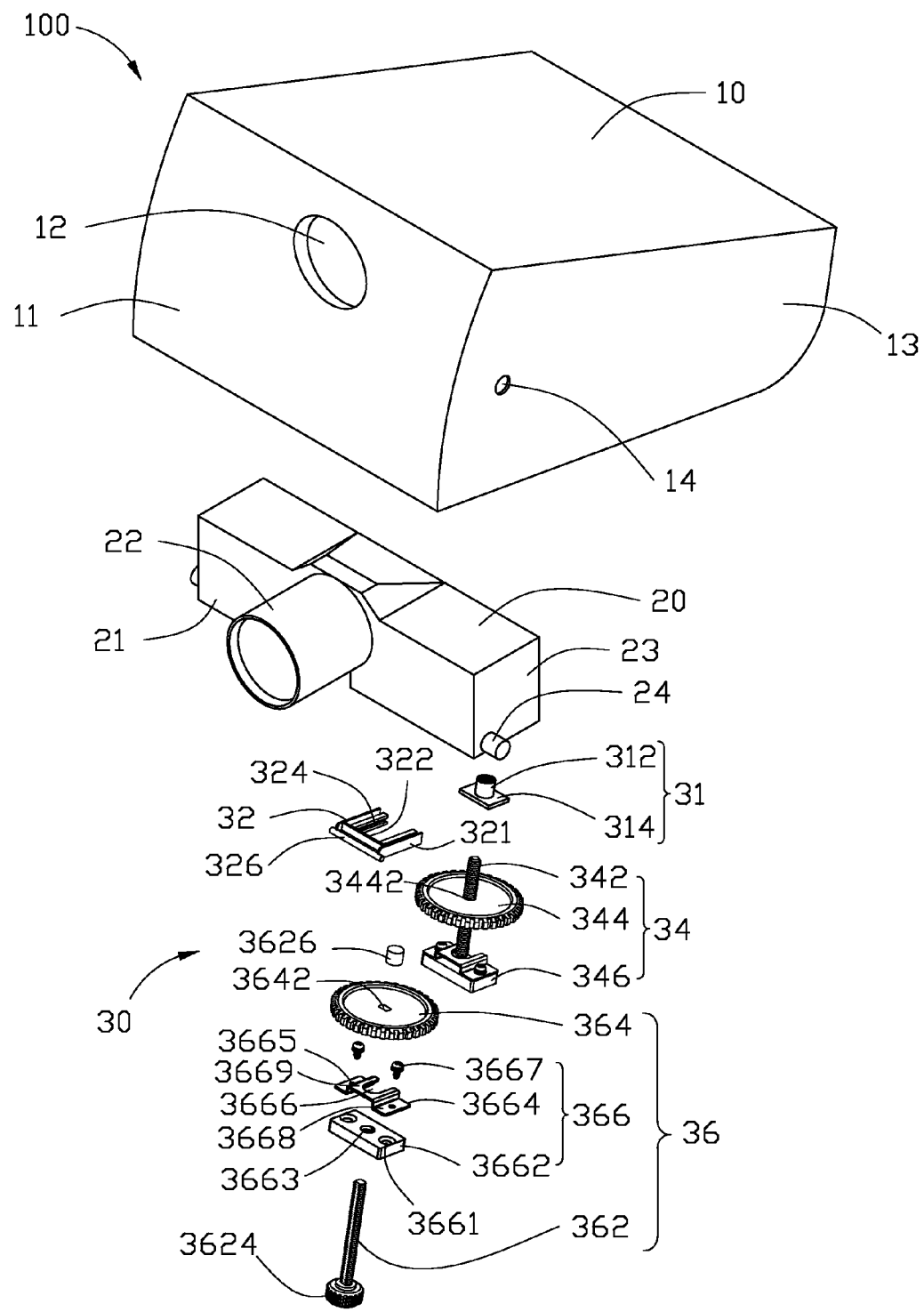
FIG. 1 is an exploded, isometric view of an exemplary embodiment of a projector including a lens module and a gear module.
Figure 2:
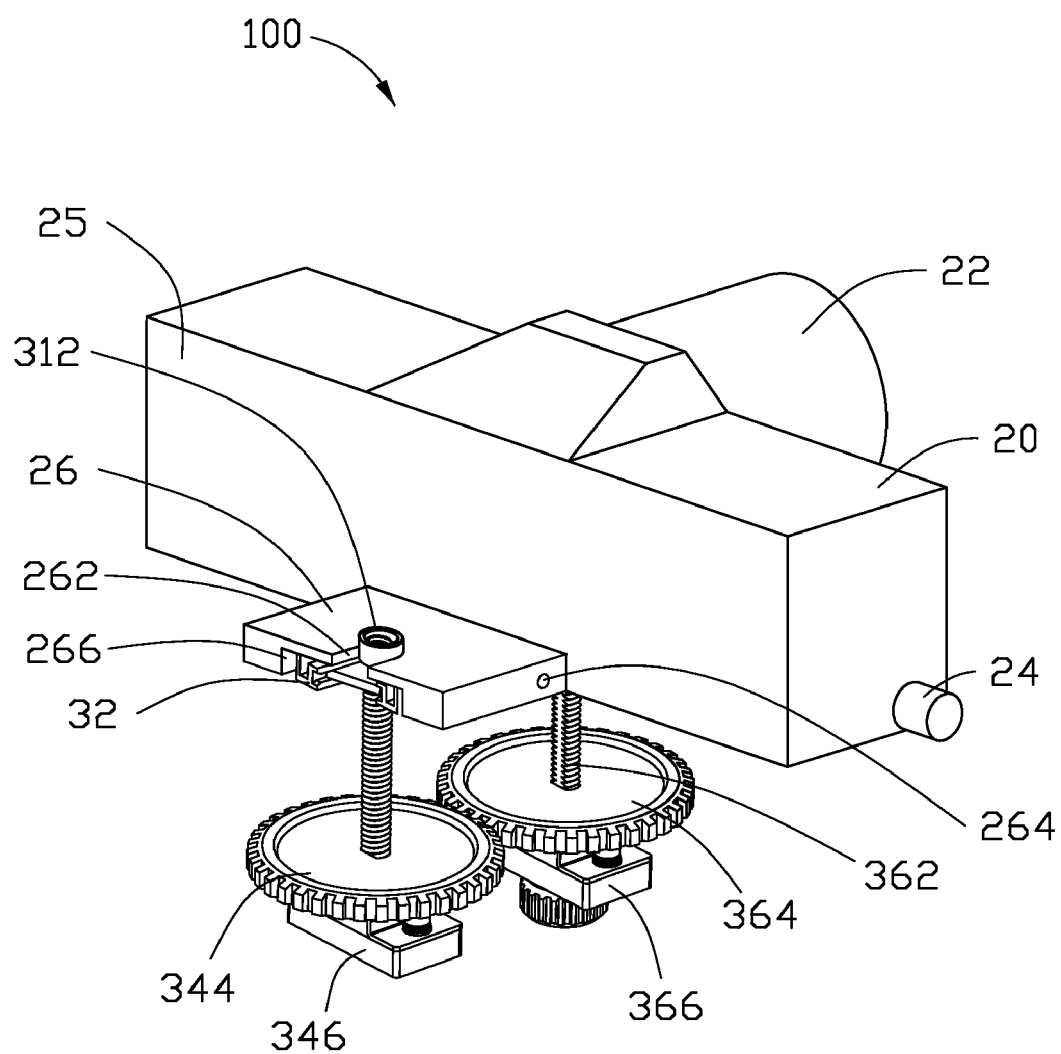
FIG. 2 is an assembled, isometric view of the lens module and the gear module of FIG. 1.
Figure 3:
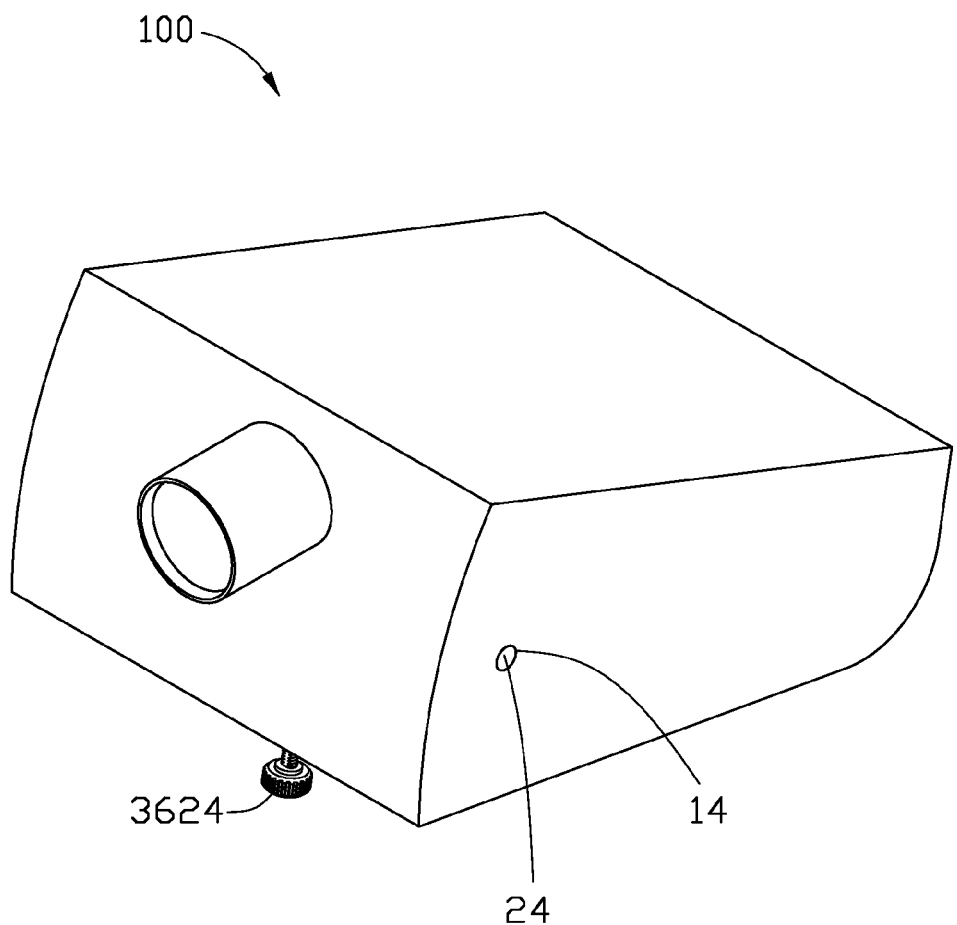
FIG. 3 is an assembled view of the projector of FIG. 1.
Figure 4:
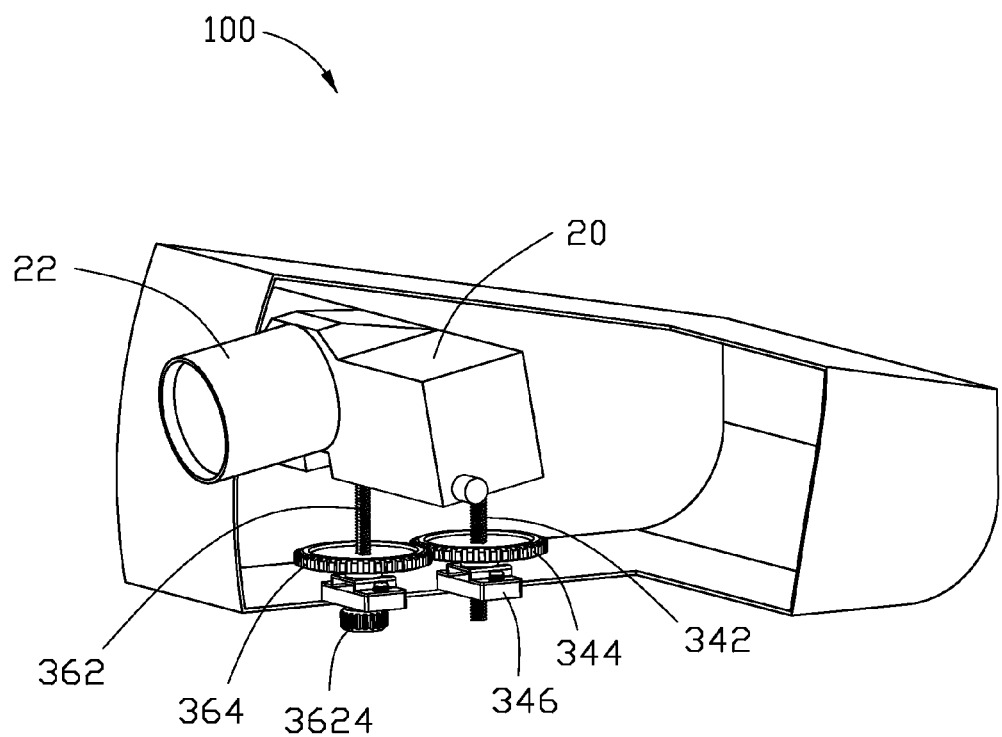
FIG. 4 is a cutaway, isometric view of the projector of FIG. 3, in a first situation.

Referring to FIGS. 1 and 2, an embodiment of a projector 100 includes a projector body 10, a lens module 20 including a lens 22 and a gear module 30.

The projector body 10 is approximately rectangular-shaped. A front panel 11 of the projector body 10 defines a through hole 12 for receiving the lens 22. A diameter of the through hole 12 is little greater than a diameter of the lens 22. Two opposite sidewalls 13 of the projector body 10 each define a pivot hole 14. A bottom 15 of the projector body 10 defines two through holes 16 and 18 (see FIG. 5), and two screw holes (not shown) at opposite sides of each of the two through holes 16 and 18. It may be understood that the projector body 10 also includes other function elements, such as a power module, and a control module for example. These other function elements fall within well-known technologies, and are therefore not described here.

The lens 22 extends from a front wall 21 of the lens module 20. Two opposite sidewalls 23 of the lens module 20 each include a post 24 corresponding to the pivot holes 14 of the projector body 10. A rectangular connecting portion 26 vertically extending from a back wall 25 of the lens module 20 forms a supporting construction for the lens module 20. A bottom of the connecting portion 26 defines a rectangular groove 266 therein. Two pivot holes 264 are defined in two opposite end surfaces of the connecting portion 26, communicating with the groove 266. A U-shaped slot 262 is defined in a distal side of the connecting portion 26, opposite to the back wall 25 and communicating with the groove 266.

The gear module 30 includes a blocking element 31, a rotatable element 32, a first gear element 34, and a second gear element 36.

The blocking element 31 includes a rectangle board 314 and a post 312 vertically extending from a center of the board 314. The blocking element 31 defines a screw hole (not labeled), through the post 312 and the board 314.

The rotatable element 32 is approximately U-shaped, and includes two parallel arms 321 and a connection portion 322 perpendicularly connected between corresponding ends of the arms 321. Inner walls of the arms 321 define two slide slots 324, respectively. A connecting pole 326 is mounted to the connection portion 322, opposite to the arms 321. Opposite ends of the board 314 of the blocking element 31 are capable to be slidably engaged in the slide slots 324, respectively. Two opposite ends of the connecting pole 326 extended out of the connection portion 322, are capable to be engaged in the pivot holes 264 of the connecting portion 26 of the lens module 20, respectively.

The first gear element 34 includes a screw pole 342 having a round cross-section, a gear 344 defining a round mounting hole 3442 in a center, and a mounting rack 346. The second gear element 36 includes a screw pole 362 having a double-D shaped cross-section, a gear 364 defining a double-D shaped mounting hole 3642, and a mounting rack 366. The screw pole 362 further includes a round rotating portion 3624 extending from a first end of the screw pole 362 to be operated to rotate the screw pole 362, and a nut 3626 to be engaged with a second end of the screw pole 362 opposite to the first end. The mounting rack 346 is similar to the mounting rack 366, therefore, the follow description only describes the construction of the mounting rack 366.

The mounting rack 366 includes a rectangular base 3662, a connecting piece 3664 with a U-shaped cross-section, and two screws 3667. Two through holes 3661 are defined in two ends of the base 3662. A screw hole 3663 is defined in a center of the base 3662, between the two through holes 3661. The connecting piece 3664 includes a rectangular portion 3669 defining a U-shaped opening 3666. Two hems 3668 extend vertically downwardly from two opposite sides of the portion 3669 and then extend out vertically. Two through holes 3665 are defined in the two hems 3668 respectively, corresponding to the two through holes 3661 of the base 3662.

Referring to FIGS. 2 to 5, in assembly, opposite ends of the board 314 of the blocking element 31 are slidably engaged in the slide slots 324 of the rotatable element 32, respectively. Opposite ends of the connecting pole 326 of the rotatable element 32 are engaged in the two pivot holes 264 of the connecting portion 26 of the lens module 20, with the post 312 of the blocking element 31 engaged in the slot 262 of the connecting portion 26 of the lens module 20. The combined assembly of the lens module 20 and the blocking element 31 are accommodated in the projector body 10, with the posts 24 of the lens module 20 rotatably engaged in the pivot holes 14 of the projector body 10, respectively. The lens 22 is inserted into the through hole 12 and exposed outside the projector body 10. The screw pole 362 of the second gear element 36 is inserted into the through hole 16 of the projector body 10, screwed into the screw hole 3663 of the base 3662 of the mounting rack 366, through the opening 3666 of the connecting piece 3664, inserted into the mounting hole 3642 of the gear 364, and then screwed into the nut 3626. The two screws 3667 are extended through the two through holes 3665 of the connecting piece 3664, the two though holes 3661 of the base 3662, and then screwed in the two screw holes at opposite sides of the through hole 16 of the projector body 10. The assembly process of the first gear element 34 is similar to the assembly process of the second gear element 36 mentioned above, so the description of the assembly process of the first gear element 34 will be omitted. A distal end of the screw pole 342 is engaged in the screw hole of the post 312 of the blocking element 31. The gear 344 and the gear 346 mesh with each other.

Figure 5:
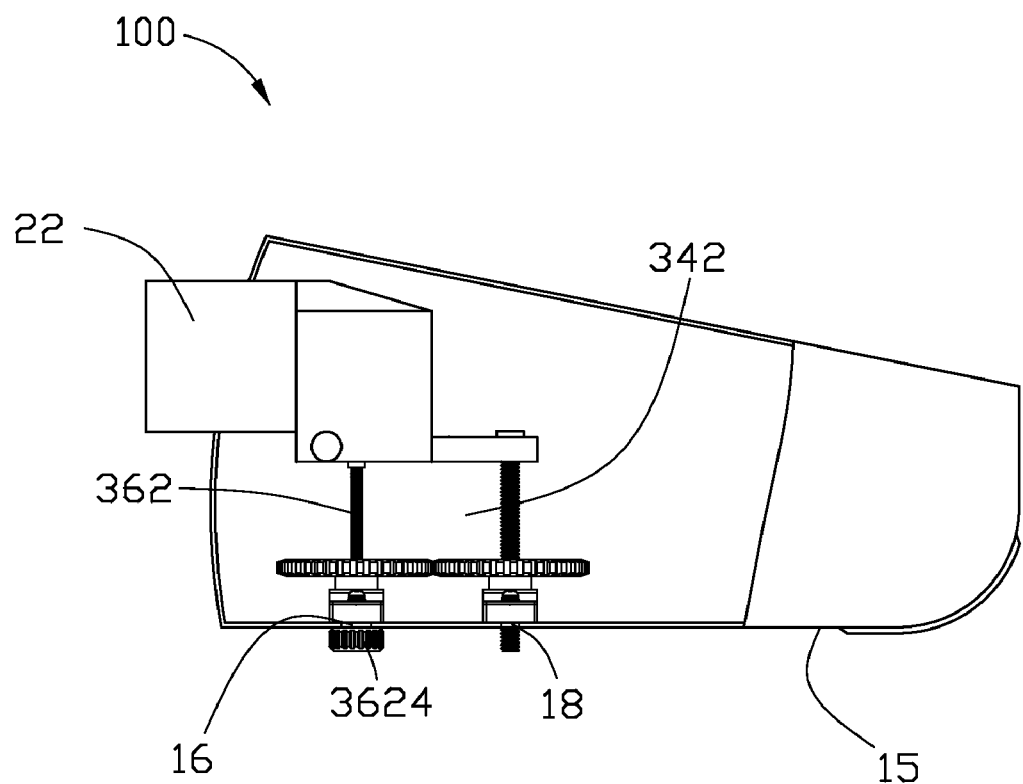
FIG. 5 is a side elevational view of the projector of FIG. 4.
Figure 6:
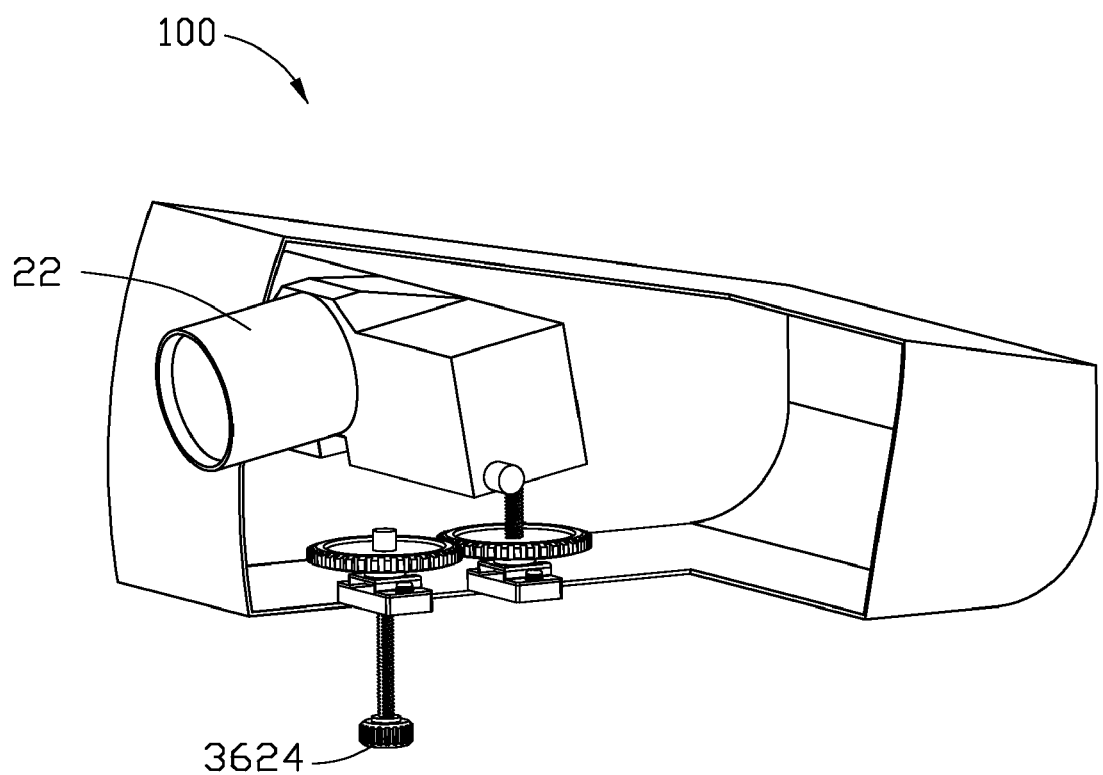
FIG. 6 is similar to FIG. 4, but in a second situation.
Figure 7:
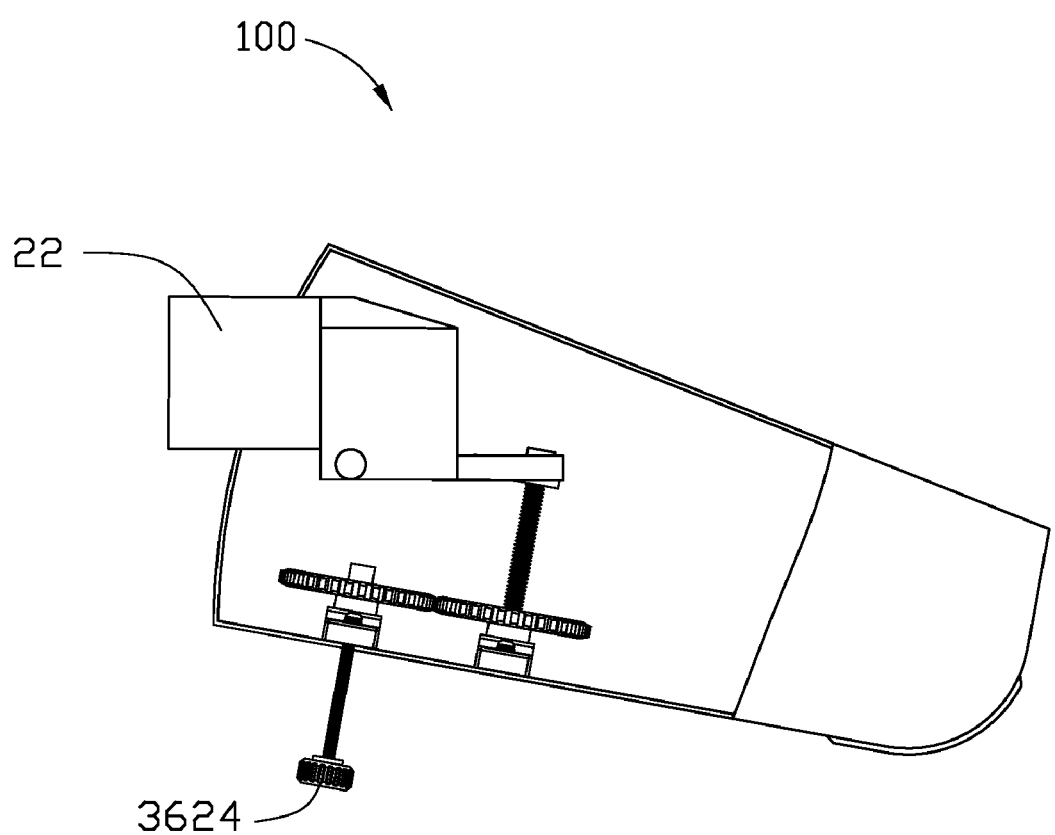
FIG. 7 is a side elevational view of the projector of FIG. 6.

Referring to FIGS. 4 to 7, in use, the projector 100 is placed on a table (not shown). When the rotating portion 3624 of the screw pole 362 is rotated, the screw pole 362 will move up and down relative to the projector body 10, according to the rotating direction of the rotating portion 3624. Therefore, an angle between the bottom of the projector body 10 and the table can be adjusted by rotating the rotating portion 3624. FIG. 5 shows a status in which the angle between the bottom of the projector body 10 and the table is least, almost zero degrees, and FIG. 7 shows a status in which the angle between the bottom of the projector body 10 and the table is greatest. When the angle between the bottom of the projector body 10 and the table is adjusted, the height of the lens 22 is adjusted indirectly, and the height of the lens 22 is lowest shown in FIG. 5 while highest shown in FIG. 7.

The gear 364 is also rotated with the rotation of the screw pole 362, to rotate the gear 344. The moving directions of the screw pole 342 and the screw pole 362 are reverse. When the screw pole 342 moves up, the connecting portion 26 of the lens module 20 is pushed up by the screw pole 342 to rotate the lens module 20 about the posts 24, therefore, the lens 22 moves down. Therefore, when the angle between the bottom of the projector body 10 and the table is changed by rotating the rotating portion 3624, the lens 22 is rotated reversely. If a gear ratio between the gears 344 and 364 is selected suitably, an angle between the lens 22 and the table will not be kept constant or substantially so, which cannot influence projected images.

It is to be understood, however, that even though numerous characteristics and advantages of the embodiments have been set forth in the foregoing description, together with details of the structure and function of the embodiments, the disclosure is illustrative only, and changes may be made in details, especially in matters of shape, size, and arrangement of parts within the principles of the embodiments to the full extent indicated by the broad general meaning of the terms in which the appended claims are expressed.

What is claimed is:

1. A projector comprising:
    a projector body comprising a front panel, a bottom connected to a bottom of the front panel, and two sidewalls connected to opposite ends of the front panel, the front panel defining a first though hole, the bottom defining two second through holes;
    a lens module rotatably mounted between the sidewalls of the projector body, the lens module comprising a lens extending out of the projector body through the first through hole of the projector body, and a connecting portion extending from the lens module opposite to the lens; and
    a gear module comprises a first gear and a second gear, the first and second gears mounted on a first screw pole and a second screw pole respectively and mesh with each other, wherein and the first screw pole is operable to extend through the one of the two second through holes, and the second screw pole is extended into the other one of the two second through holes of the projector body; the first screw pole is rotatably connected to the connecting portion, wherein the first and second screw poles moves reversely to adjust a height of the lens and keep an angle of the lens substantially constant, in response to the second screw pole being rotated.

2. The projector of claim 1, wherein the projector body is rectangular-shaped, the sidewalls define two pivot holes, the lens module further comprises two posts extending from opposite ends of the lens module to rotatably engaged in the pivot holes of the projector body.

3. The projector of claim 1, wherein the gear module further comprises a blocking element and a rotatable element, wherein the connecting portion is rectangular-shaped, and defines a rectangular groove in a bottom of the connecting portion, two second pivot holes are defined in opposite ends of the connecting portion communicating with the rectangular groove, a U-shaped slot is defined in the connecting portion communicating with the groove and opposite to the lens module; wherein the blocking element comprises a rectangle board and a post vertically extending from the board, a screw hole is defined in the blocking element through the board and the post, the rotatable element is U-shaped and comprises two parallel arms defining two opposite slide slots respectively and a connection portion perpendicularly connected to the arms, a connecting pole is mounted to the connection portion, the board is slidably engaged in the two slide slots, and opposite ends of the connecting pole are rotatably engaged in the two second pivot holes, the first screw pole is screwed in the screw hole of the blocking element.

4. The projector of claim 1, wherein the gear module further comprises a first mounting rack and a second mounting rack each comprise a rectangular base, and two screws, two third through holes are defined in the base, a screw hole is defined in the base between the two third through holes, the first and second mounting racks are positioned on the bottom of the projector body by the two screws extending through the two third through holes to be screwed in the bottom of the projector body.

* * * * *